April 12, 1955 M. A. HALTTUNEN 2,706,025
DIESEL SHUTDOWN MECHANISM
Filed Jan. 19, 1954
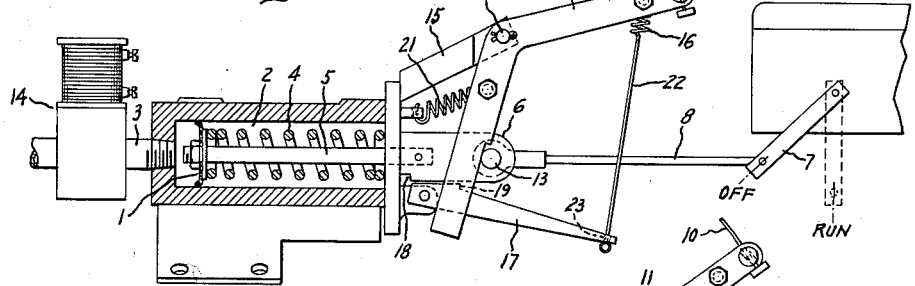
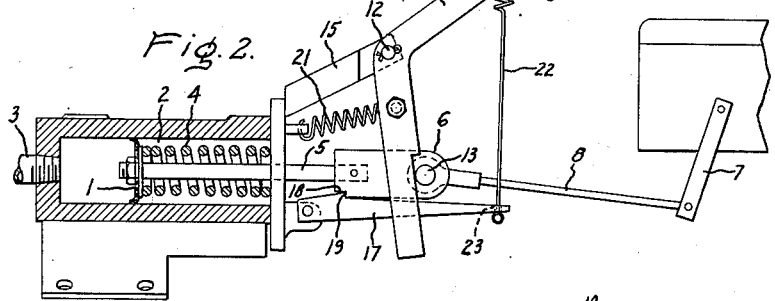
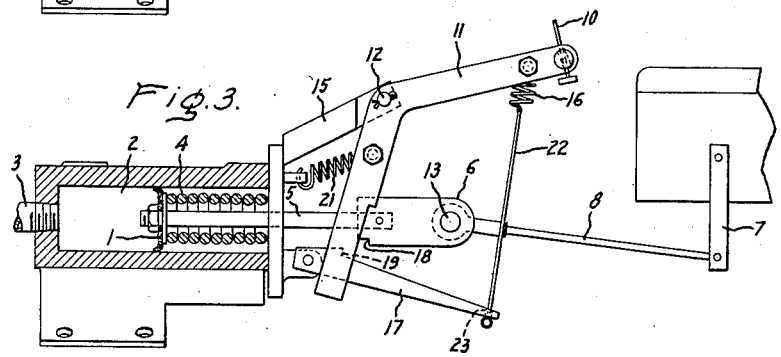
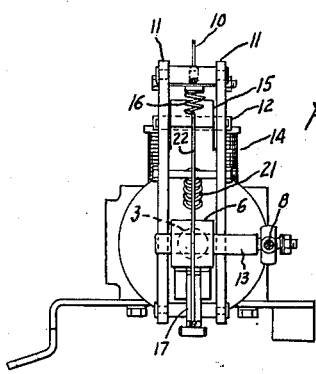
Inventor:
Martin A. Halttunen,
by Claude N. Mott
His Attorney.

United States Patent Office 2,706,025
Patented Apr. 12, 1955

2,706,025

DIESEL SHUTDOWN MECHANISM

Martin A. Halttunen, Erie, Pa., assignor to General Electric Company, a corporation of New York Application January 19, 1954, Serial No. 404,988

4 Claims. (Cl. 192—1)

This invention relates to a diesel shutdown mechanism for preventing fuel from being admitted to the combustion chamber of a prime mover and more particularly, for a manual reset means operable when the air pressure of the braking system is below a predetermined amount.

A safety mechanism ordinarily is provided for preventing fuel from flowing to a prime mover combustion chamber under certain predetermined conditions. In a locomotive operation, it is desirable to have braking air pressure before the prime mover is allowed to operate at load efficiency to move the train. Usually such a safety mechanism must be positioned near the prime mover because it is mechanically connected to a valve in the fuel system of the engine. To reset this mechanism when the air pressure is below the predetermined minimum, it has been necessary for the engineer to leave his control position, open and manual lock the safety mechanism, return to his control position, and start the engines. After the engines have run a predetermined time and the air pressure is sufficient to safely operate the train, the air pressure will move the piston of the shutdown mechanism to release the manual lock which has held the safety mechanism open to allow the admission of fuel to the prime mover.

It is, therefore, an object of my invention to provide a simple diesel shutdown mechanism that may be operated remotely with, or without, a predetermined air pressure.

Further objects and advantages of my invention will become apparent and the invention will be better understood by reference to the following description and the accompanying drawings. The features of novelty which characterize this invention will be pointed out with particularity in the claims annexed to and forming part of this specification.

In accordance with this invention, an electrically actuated, air operated fail safe shutdown mechanism for shutting down the prime mover of a diesel electrical locomotive is provided with a manual reset mechanism. When the locomotive air pressure is more than 20 lbs. per sq. in., the engineer merely energizes a magnetically operated valve which allows air into the cylinder of the shutdown mechanism causing the piston to compress a biasing spring and travel the full distance to the "run" position. When in the "run" position, the mechanism fully opens a valve of the prime mover to allow fuel to be admitted to the combustion chambers. The engineer then starts the engine in the normal manner.

However, when the locomotive has been idle for a day or two, the air pressure may not be sufficient to compress the spring of the shutdown mechanism enough to move the piston sufficiently to release the valve for admitting fuel to the combustion chambers. When the operator finds this condition, he manually sets the mechanism to partially open the fuel admitting valve of the prime mover. This manual reset places a latch against a portion of the plunger of the shutdown mechanism to hold the spring of the mechanism partially compressed. When the manual reset is released, the latch prevents the plunger from returning to the fully closed position and allows the operator to start the prime mover and run it at idle. As soon as the air pressure in the locomotive lines reaches a safe operating pressure, such as 20# per sq. in., it will force the plunger to the fully open position so that the locomotive may be operated normally. This action automatically releases the latch mechanism so that, should there be a subsequent air pressure failure or any failure or signal that allows the magnetic valve to close, the shutdown mechanism will operate normally. It should be noted that in the manually latched position, the shutdown mechanism is only partially opened so that the locomotive may not be run under full load.

This invention will be better understood and other objects and advantages appreciated by referring to the following detailed specification taken in conjunction with the accompanying drawings in which:

Fig. 1 is a side view of the diesel shutdown mechanism partially broken away;

Fig. 2 is a side view of the mechanism shown in Fig. 1 with the manual reset tensioned;

Fig. 3 is a side view of the mechanism shown in Fig. 1 with the piston in the run position; and Fig. 4 is an end view of the mechanism shown in Fig. 1.

Referring now to the drawings, I have shown a piston for sensing the air pressure from the locomotive air lines within a chamber 2. When the operator is ready to start the locomotive prime mover, he actuates a magnetic valve to admit the brake line air into chamber 2 through pipe 3. The return spring 4 prevents operation of the piston 1 at extremely low pressures and returns the piston to the closed position when pressure is removed which may occur during a fault condition.

When preparing to start the engine, the operator actuates a magnetic switch 14 to admit the locomotive brake line air pressure into the pipe 3. This causes the piston 1 to move the piston rod 5 towards the right. The clevis 6 is attached to the rod 5 preventing the rod 5 from extending into the cylinder enough to completely release the tension on the spring 4. To start the prime mover, a valve inside the engine must be opened enough to permit fuel to enter the combustion chambers. This valve is attached to a lever 7 which in turn is operated by a linkage rod 8 attached to the clevis 6. After the brake air pressure in the locomotive lines has moved the piston 1 sufficiently to cause the lever 7 to move to the "run" position, the operator starts the prime mover in the conventional manner.

When the locomotive has been sitting idle for some time, it often is found that there is not sufficient residual air pressure in the locomotive brake air lines to cause the piston 1 to open the valve attached to lever 7. When the operator sees that the lever 7 has not moved to the "run" position, he will merely have to set the manual reset linkage by pulling the handle 9 which is connected to the cable 10, causing the linkage member 11 to rotate about the pivot point 12 and move the linkage rod 8 to the right by exerting a pressure on the pin 13.

Referring to Fig. 2, it is clear that tension on the cable 10 will rotate the linkage member 11 counterclockwise, and at the same time, will create tension in the spring member 16 to raise the latching lever 17. To latch the clevis 6 in the partially open position, a notch 18 is cut in the lower portion of the clevis 6 and a latch 19 is cut in the latching lever. The latch 17, latch spring 16, and lever assembly of the manual linkage are arranged so that when the manual reset linkage is moved from the "off" position toward the "run" position, the free end of the latch 17 is lifted by the latch spring 16 until the latch tooth 19 comes in contact with the smooth underside of the clevis 6. Up to this point, the lifting of the latch 17 by spring 16 is effected by the whole latch spring moving upward as a solid member without the spring being tensioned. Further movement of the manual reset linkage will then cause the latch spring 16 to be tensioned and thus hold the latch tooth 19 against the clevis 6. When the operator pulls on the handle 9, he will compress the spring 4 and move the clevis 6 to the right enough to latch the mechanism. A stop member such as 20 may be placed on the cable 10 to prevent the operator from moving the linkage member 11 more than is necessary to latch the notch 18 for holding the lever 7 in the partially opened position.

After the operator has applied tension to the cable 10, sufficient to move the clevis 6 to the position shown in Fig. 2, he releases the handle 9. At this time, spring 4 causes the piston 1 and clevis 6 to move toward the left. However, the latch tooth 19 as shown in Fig. 2 catches the notch 18 because spring 16 is still tensioned to hold the lever 17 in the raised position as long as the member 11 has rotated an appreciable amount in the counterclockwise direction. The spring 21 is designed primarily to return the linkage member 11 to the position shown in Fig. 3. However, it may create sufficient tension to return the cable 10 and the handle 9 to their respective inoperating positions.

The latch 19 will catch the member 6 and be held in the latched position by the pressure from spring 4 after the member 11 has returned to its normal position. At this time the rod 22, attached to the spring 16, is free to pass through the slip fit hole 23 in the free end of the latching lever 17. The return of rod 22 to this inoperative position will allow the latching lever 17 to drop when the latch tooth 19 is released.

As the brake air pressure in pipe 3 builds up, it will operate on the piston 1 to release the tension between the latch 19 and the notch 18, and as shown in Fig. 3, will finally cause the piston 1 to move to the "run" position. At this time, there is no tension between the latching lever 17 and the clevis 6 and no tension created by the spring 16. Thus, the lever 17 will return to its normal position, releasing the shutdown mechanism to sense a failure of brake air pressure in the mechanism. The bottom end of the rod 22 is enlarged to act as a stop for the latching lever 17 when it drops down.

In summary, the operator normally will energize the magnetic valve operator 14 which will allow the locomotive brake air pressure to enter the pipe 3 and force the piston 1 to the position shown in Fig. 3. Should it be apparent to the operator that the pressure is not sufficient to cause the lever 7 to move to the "run" position so that the engine may be properly started, he will pull on the handle 9 to rotate the linkage member 11 counterclockwise as shown in Fig. 2. The operation of the linkage member 11 causes the spring 16 to be tensioned which in turn raises the latching lever 17 to an engaging position with the tooth 18 of the clevis 6. When the operator releases the handle 9, the spring 4 causes the piston rod 5 to move toward the left so that the latch 19 is engaged by the cut-away portion 18 of the clevis 6. When the operating mechanism is in the latched position, the lever 7 is moved enough toward the "run" position to start the prime mover for charging the locomotive air pressure line. After the engines have run for a few minutes, the pressure in pipe 3 will build up to at least 20# per sq. in. and cause the piston 1 to move its full stroke and allow the operator to run the engines under load.

It will now be seen that this invention provides an improved fail-safe shutdown mechanism for shutting down the diesel engine upon the failure of the air pressure in the locomotive. Any electrical signals indicating any unsafe condition may be used to allow release of the magnetic valve to shut down the engine.

In addition to being a safety shutdown mechanism, this mechanism is used for normal shut down when the operator simply opens a switch on his control panel to release the magnetic valve.

While I have shown and described a specific embodiment of this invention, further modifications and improvements will occur to those skilled in the art. I desire it to be understood therefore, that this invention is not limited to the form shown, and I intend the appended claims to cover all modifications which do not depart from the spirit and scope of this invention.

What I claim as new and desire to secure by Letters Patent of the United States is:

1. In a locomotive prime mover brake air pressure operated shutdown mechanism for preventing the flow of fuel to the prime mover in the absence of brake air pressure, a means for manually holding said shutdown mechanism partially opened when said prime mover shutdown mechanism will not open in response to brake line air pressure of said locomotive, said means comprising linkage means for partially opening said shutdown mechanism, cable means for remotely operating said linkage means, and latching means resiliently connected to said linkage means for preventing said shutdown mechanism from fully closing when said cable means is released, whereby said prime mover may be started and run at idling speed to build up the locomotive brake air pressure.

2. In a locomotive prime mover brake air pressure operated shutdown mechanism which includes a piston for preventing the flow of fuel to the prime mover in the absence of brake air pressure, a mechanism for manually holding the piston of said shutdown mechanism partially opened when said piston will not move in response to brake line air pressure of said locomotive, said mechanism comprising a clevis operatively attached to said piston, a spring for biasing said piston to close said shutdown mechanism upon air failure, linkage means for partially compressing said spring, cable means for operating said linkage means, a latch tooth on said clevis, and latching means resiliently connected to said linkage means for engaging said tooth to prevent said shutdown mechanism from fully closing when said cable means is released, whereby said prime mover may be started and run at idling speed to build up the locomotive brake air pressure.

3. In a locomotive prime mover brake air pressure failure shutdown mechanism which includes a piston for preventing the flow of fuel to the prime mover in the absence of brake air pressure, a mechanism for manually holding the piston of said shutdown mechanism partially opened when said piston will not move in response to brake line air pressure of said locomotive, said mechanism comprising a clevis operatively attached to said piston, a spring for biasing said piston to close said shutdown mechanism upon line air pressure failure, a pin attached to said clevis, linkage means operatively connected to said pin for moving said clevis to partially compress said spring, cable means for operating said linkage means, a latch tooth on said clevis, a latching lever resiliently connected to said linkage means, and a latch on said lever for engaging said tooth to prevent said shutdown mechanism from fully closing when said cable means is released, whereby said prime mover may be started and run at idling speed to build up the locomotive brake air pressure.

4. A diesel shutdown mechanism for preventing the flow of fuel to a prime mover of a locomotive in the absence of brake air pressure comprising a chamber, a piston within said chamber biased to a closed position, means connected to said piston for preventing the flow of fuel to said prime mover when said piston is in said closed position, means for admitting air from a brake air pressure line into said chamber to move said piston from said closed position to allow operation of said prime mover, means for manually moving said piston from said closed position in the absence of brake air pressure to allow the prime mover to be started and run at idle speed, and latching means connected to said means for manually moving said piston for preventing said piston from returning to the closed position until the brake air pressure increases enough to move the piston from the latched position.

References Cited in the file of this patent

UNITED STATES PATENTS

| | | |
|---|---|---|
| 2,096,291 | Tanner | Oct. 19, 1937 |
| 2,131,264 | Benjamin | Sept. 27, 1938 |
| 2,459,938 | Higgins | Jan. 25, 1949 |